March 10, 1959     B. H. SWEITZER     2,876,654
SHOCK ABSORBER STEERING WHEEL CONSTRUCTION
Filed Nov. 13, 1956
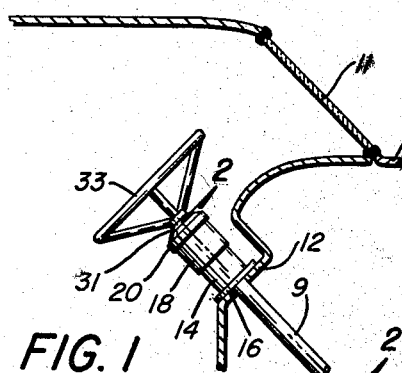
FIG. 1
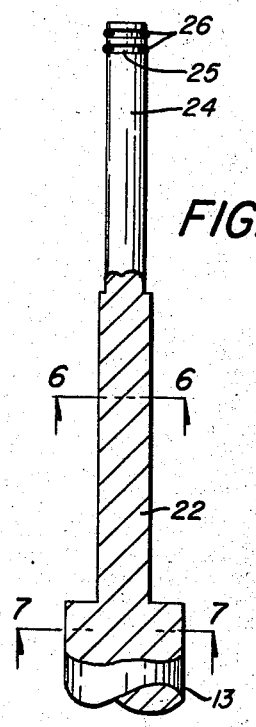
FIG. 5
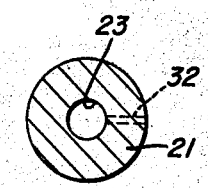
FIG. 3
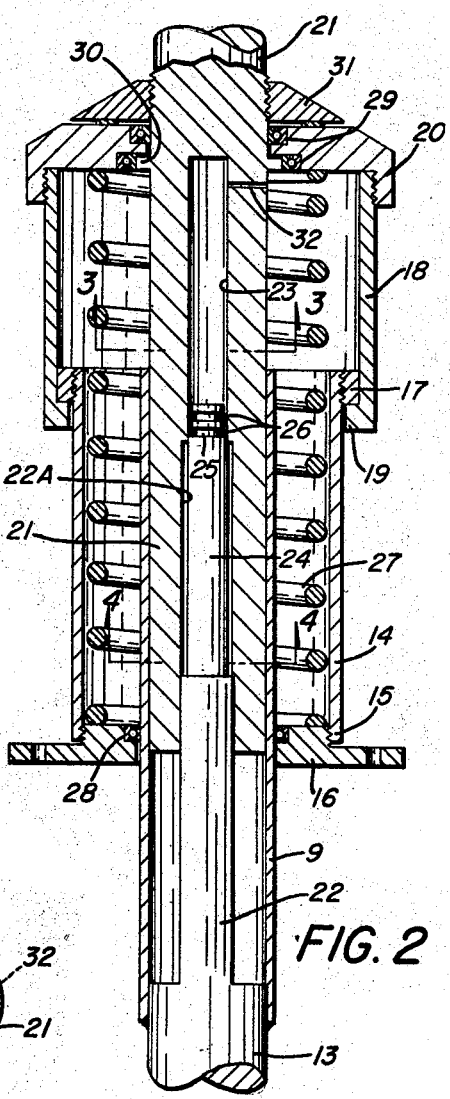
FIG. 2
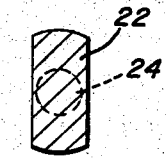
FIG. 6
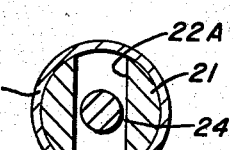
FIG. 4
FIG. 7
INVENTOR.
BENJAMIN H. SWEITZER
BY
W. B. Harpman
ATTORNEY United States Patent Office 2,876,654
Patented Mar. 10, 1959

2,876,654

SHOCK ABSORBER STEERING WHEEL CONSTRUCTION

Benjamin H. Sweitzer, Youngstown, Ohio

Application November 13, 1956, Serial No. 621,970

3 Claims. (Cl. 74—493)

This invention relates to automotive vehicles and more particularly to a shock absorber construction for an automotive vehicle steering wheel.

The principal object of the invention is the provision of a steering wheel construction incorporating a telescopic shock absorber mechanism.

A further object of the invention is the provision of a simple and inexpensive shock absorber construction for a steering wheel shaft.

A still further object of the invention is the provision of a shock absorber construction incorporating resilient spring means and air cylinder cushioning in a telescopic steering shaft assembly.

A still further object of the invention is the provision of a steering wheel shaft incorporating a telescopically arranged mechanism for yieldingly absorbing shocks directed thereagainst and at the same time providing steering control therethrough.

This is a continuation-in-part of my patent application Serial No. 604,647, filed August 17, 1956, and now abandoned, on Shock Absorber Steering Wheel Construction.

The shock absorber steering wheel construction disclosed herein comprises a simple and double-acting shock absorber which may be incorporated in the steering column of a motor vehicle at very low cost and which will operate efficiently to prevent injury from the driver striking the steering wheel and or steering column.

The construction disclosed herein incorporates spring means and air cylinder means for cushioning and controlling the rate of telescopic action of the device and is arranged so that a minimum of frictional contact exists between the parts to insure freedom of action at all times.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a detail of a part of a motor vehicle including a steering column and steering wheel and showing the shock absorber mechanism installed telescopically.

Figure 2 is an enlarged detail taken on line 2—2 of Figure 1.

Figure 3 is a cross section taken on line 3—3 of Figure 2.

Figure 4 is a cross section taken on line 4—4 of Figure 2.

Figure 5 is an enlarged detail of the upper end of the steering shaft normally engaged in the device of Figure 2.

Figure 6 is a section taken on line 6—6 of Figure 5.

Figure 7 is a section taken on line 7—7 of Figure 5.

By referring to the drawing and Figure 1 in particular it will be seen that a portion of an automobile body is indicated at 10 with a windshield 11 and a dash construction 12. A steering shaft 13 extends upwardly through the dash construction 12 and with the dash 12 supports a cylindrical housing 14 which is annularly spaced about the shaft 13. A sleeve 9 holds the shafts in alignment.

The cylindrical housing 14 is threaded internally as at 15 around its lowermost edge and engaged upon an externally threaded part of a bottom portion 16 which is adapted to be secured to the dash 12 of the vehicle in which the construction is employed.

The upper outer edge of the cylindrical housing 14 is threaded and receives a flange 17 which is slidably engaged within a secondary cylindrical housing 18, the lower edge of which is flanged inwardly as at 19.

The upper outer edge of the secondary cylindrical housing 18 is threaded and is engaged in a cap 20 which is centrally apertured so that a secondary steering shaft 21 may pass therethrough. The secondary steering shaft 21 is in axial alignment with the steering shaft 13 and it will be observed that the lower end of the secondary steering shaft 21 is bifurcated so as to form means for engaging and imparting movement to a tranversely flattened extension 22 formed on the upper end of the steering shaft 13 and partially engaged between the bifurcated lower end of the secondary steering shaft 21.

The secondary steering shaft 21 also has a cylindrical chamber 23 formed therein inwardly of the bifurcated end and the transversely flattened extension 20 carries a round piston-like extension 24 on its uppermost end which is engaged in the cylindrical chamber 23. The piston-like extension 24 is grooved as at 25 for the reception of O-rings 26.

The transversely flattened extension 22 of the steering shaft 13 is engaged in the transversely formed slot defined by the bifurcated end of the secondary steering shaft 21 and is movable longitudinally thereof, as shown in Figure 2 of the drawing.

The sleeve 9 is positioned on the upper portion of the steering shaft 13 and extends upwardly and slidably receives the lower end of the secondary steering shaft 21 and its bifurcated end structure. The sleeve 9 maintains the shafts 13 and 21 in axial alignment during their relative telescopic motion.

A coil spring 27 is disposed about the exterior of the sleeve 9 and within the cylindrical housings 14 and 18 and engaged against the bottom 16 and the cap 20 so that it provides tension against the telescopic movement of the steering shafts 13 and 21 .

The bottom 16 and the cap 20 are provided with bearing assemblies 28 and 29, respectively, about the apertures therein. It will be observed that one of the bearing assemblies 29 engages the peripheral edge of a flange 30 formed on the secondary steering shaft 21 and acts to prevent the secondary shaft 21 from being moved upwardly through the cap 20.

The bearing assemblies 28 and 29 permit the shafts 13 and 21 and sleeve 9 to move freely without imparting similar motion to the bottom 16 or the cylindrical housings 14 and 18 or the cap 20.

The secondary cap 31 is threadably engaged on the secondary steering shaft 21 and revolves with the same and acts to position the cap 20 and the housing 18 relative to the secondary steering shaft 21.

Still referring to Figure 2 of the drawing it will be seen that the steering wheel shock absorber construction includes a restricted passageway 32 which establishes communication between the cylindrical chamber 23 and the interior of the cylindrical housings 14 and 18 which enclose the coil spring 27.

It will thus be seen that the steering wheel shock absorber construction comprises the steering shaft 13 telescopically engaged in the secondary steering shaft 21 with the piston-like extension 24 reciprocally engaged in the cylindrical chamber 23 and with the cylindrical housings 14 and 18 also telescopically engaged one in the other. The coil spring 27 normally urges the assembly apart and the retaining means illustrated prevents separation of the several parts.

The action of the telescopically arranged cylindrical housings 14 and 18 comprises the formation of a secondary air compressing device with respect to the primary air compressing device comprising the cylinder 23 and piston 24.

At such time as a steering wheel 33 on the secondary steering shaft 21 (as seen in Figure 1 of the drawing) is forcibly engaged, the construction will act to yieldingly receive the force of engagement and prevent injury to the driver, in accordance with the several objects.

It will thus be seen that the construction disclosed herein meets the several objects of the invention.

Having thus described my invention, what I claim is:

1. A telescopically arranged shock absorbing construction for a vehicle steering column including a steering shaft and a secondary steering shaft, and a sleeve engaging the same and holding the same in axial alignment, said steering shaft having a transversely flattened extension on the upper end thereof, the outermost portion of which comprises a rounded piston, said secondary steering shaft being transversely slotted inwardly from its lower end and having a cylindrical chamber formed inwardly from said slotted portion, said transversely flattened extension on said steering shaft and said piston thereof being slidably engaged in said transversely slotted secondary shaft and cylindrical extension therein, respectively, cylindrical housings slidably engaged one with the other in telescopic relation positioned about said shaft and secondary shaft, respectively, top and bottom portions secured to said cylindrical housings, said top and bottom portions having centrally positioned apertures therethrough engaged on said shaft respectively, a coil spring disposed within said housings between said top and bottom portions and acting to resist telescopic motion of said shafts and said housings, a cap engaged on said secondary shaft and against said top portion, and sealing means between said cap and said top portion.

2. The shock absorbing construction for a vehicle steering column set forth in claim 1 and wherein said cylindrical housings are arranged to form a secondary air compressing device.

3. A telescopically arranged shock absorbing construction for a vehicle steering column including a steering shaft and a secondary steering shaft, said first mentioned steering shaft having a transversely flattened extension on the upper end thereof, the outermost portion of which comprises a rounded piston, said secondary steering shaft being transversely slotted inwardly from its lower end and having a cylinder formed inwardly from said slotted portion, said transversely flattened extension on said steering shaft and said piston thereof being slidably engaged in said transversely slotted secondary shaft and cylinder therein, respectively, cylindrical housings slidably engaged one with the other in telescopic relation secured to said shaft and secondary shaft, respectively, so as to enclose the same in the area of their engagement and a coil spring disposed within said housings and acting to resist telescopic motion of said shafts and said housings, said cylindrical housings arranged to form a secondary air compressing device, said cylindrical housings having centrally apertured top and bottom portions respectively, through which said shafts pass, one of said cylindrical housings having an outturned flange on one end and the other of said cylindrical housings having an inturned flange on one end, said flanges constituting means providing interengagement of said housings.

References Cited in the file of this patent

UNITED STATES PATENTS

| 1,295,065 | Riley et al. | Feb. 18, 1919 |
| 2,205,597 | Marvin | June 25, 1940 |
| 2,227,821 | Burrell | Jan. 7, 1941 |
| 2,511,165 | Lyman | June 13, 1950 |
| 2,716,355 | Schmid | Aug. 30, 1955 |
| 2,828,646 | Farmer | Apr. 1, 1958 |